United States Patent [19]

Wieser et al.

[11] 4,448,796

[45] May 15, 1984

[54] COATING OF PLANT SEEDS

[75] Inventors: Franz Wieser, Linz; Hans-Peter Hofinger, Wels, both of Austria

[73] Assignee: Societe D'Assistance Technique Pour Produits Nestle S.A., Lausanne, Switzerland

[21] Appl. No.: 438,607

[22] Filed: Nov. 2, 1982

[30] Foreign Application Priority Data

Nov. 30, 1981 [EP]  European Pat. Off. ............ 81110000

[51] Int. Cl.³ ............................................... A01C 1/06
[52] U.S. Cl. ......................................... 427/4; 47/57.6;
47/DIG. 9; 427/212
[58] Field of Search .............. 47/DIG. 9, 57.6; 427/4, 427/212; 428/15, 403

[56]  References Cited

U.S. PATENT DOCUMENTS 4,344,979  8/1982  Gago et al. .............................. 427/4
4,368,591  1/1983  Burke et al. ......................... 47/57.6

Primary Examiner—Michael R. Lusignan
Attorney, Agent, or Firm—Vogt and O'Donnell

[57]  ABSTRACT

A binder solution for applying plant protectants and similar agents to seeds includes a metal pigment such as copper, aluminium or bronze. Presence of the pigment produces a particularly smooth-surfaced coating providing improved abrasion resistance and flow properties.

10 Claims, No Drawings

COATING OF PLANT SEEDS

This invention is concerned with the coating of plant seeds.

To meet specific needs, various coatings have been applied to seeds. For example, seeds have been "pelletized" to make them more uniform in size, thereby facilitating handling and mechanical sowing. Pelleting is especially useful for small seeds and seeds of irregular shape. Alternatively, coatings have been applied to seeds as a means of protection against disease, especially in cold climates.

To the coatings may also be adhered alkaline substances, especially to those applied to seeds preferring neutral soils but which are to be sown in acid soils. Coatings retarding germination have also been applied to seeds of plant varieties normally flowering and maturing over different time intervals so that coated and uncoated seeds may be planted simultaneously. Both the varieties will then flower at the same time. This technique is useful in the production of hybrid seed corn.

Whilst the application of a coating is a relatively simple procedure, it must nevertheless meet certain criteria in order to be a viable operation capable of being carried out economically on a large scale. The applied coating should be even and have sufficient mechanical resistance to remain intact on handling in order to assure maximum protection for the seed. Methods of applying coatings should desirably be capable of treating in a short processing time large quantities of seed, up to 10 tonnes per hour, without any significant losses. The coating itself should be stable on storage and unaffected by temperature changes.

Our European Pat. No. 10630 is directed to a process for treating plant seeds by forming on the surface of the seeds a firmly adhering, moisture-permeable, essentially water-insoluble coating, which process comprises applying to the seeds an essentially non-aqueous coating solution of the following composition:

| | |
|---|---|
| binder | 3.5 to 22.5% by weight |
| binder solvent | 67.0 to 87.0% by weight |
| fungicide | 7.0 to 22.5% by weight |
| insecticide | 0 to 26.0% by weight |
| minor additives | 0 to 3.0% by weight | wherein (i) the binder is a natural or synthetic resin or a natural or synthetic wax, and (ii) the respective weight ratios of solvent to binder and solvent to total solids in the solution are 3.5 to 20:1 and 1.8 to 4.2:1, and thereafter eliminating the solvent.

It has now been found that incorporation of a metal pigment in compositions of the type described in our aforementioned patent produces coatings which have particularly smooth surfaces, so that their abrasion resistance is increased and the flow properties of the coated seeds are improved.

This invention thus provides a process for treating plant seeds with an active ingredient which includes forming on the surface of the seeds a firmly adhering, moisture-permeable, essentially insoluble coating by applying to the seeds a coating solution comprising 4.0 to 20% by weight of a binder and 45 to 95% by weight of a solvent for the binder, wherein (i) the binder is a natural or synthetic resin or a natural or synthetic wax, and (ii) the respective weight ratios of solvent to binder and solvent to total solids in the solution are 3.5 to 20:1 and 0.4 to 6.0:1, and thereafter eliminating the solvent, characterised in that the coating solution also contains 5.0 to 25.0% by weight of a metal pigment. By "active ingredient" are meant substances such as insecticides, fungicides and similar materials used for protecting the seed. These may be incorporated in the solution itself or, in some cases, may be sprayed onto the seeds immediately following application of the solution.

The metal pigment may be a copper, bronze or aluminium pigment, used as a powder or paste. With pigment concentrations (based on pure metal) in the coating solutions within the stated range, after elimination of the solvent the coating on the seed will contain up to 1%, and preferably 0.1 to 0.5% by weight of the pigment. Especially preferred concentrations of pigment in the finished coatings are around 0.2%, corresponding to around 7% based on the coating solutions without addition of active ingredient(s). Bronge pigments of high copper contents should however be avoided.

The binder is essentially insoluble in water under conditions prevailing during storage of the coated seed and in the soil, so that the seed is much less sensitive to exposure to moisture on storage and after sowing is not washed off the seed by rain. The active ingredient or ingredients thus remain with the seed for a longer time, affording improved protection. The coating however is moisture-permeable so that the seed germinates normally. Examples of preferred binders include shellac, polystyrene, polyethylene glycol or coffee wax (usually obtained by solvent extraction of green coffee). Mixtures of binders may also be used, as for example shellac with coffee wax or polyethylene glycol. The amount of binder present in the coating solution will normally vary according to its nature. Thus, natural substances taken together may be present in amounts of up to about 25% by weight, whereas synthetic resins will usually not exceed about 10% of the weight of the coating solution. The term "solution" is used for convenience, denoting that the binder is dissolved in the solvent. However, active ingredients may be present, notably one or more fungicides, which do not dissolve in the solvent, so therefore technically the "coating solution" may in fact also be a suspension.

As previously noted, the solvent (which term for convenience also designates solvent mixtures) will be selected having regard to the binder used, and will normally be a lower alkanol or ketone or a halogenated hydrocarbon. In certain instances—for example when an active ingredient is water soluble—an aqueous solvent phase may be used provided, of course, that the binder can also be dissolved in this solvent. Thus, when the binder is shellac or a mixture of shellac and coffee wax, the solvent phase may include an organic solvent such as ethanol alone, or with water together with an alkali (e.g. NaOH). The function of the alkali is to solubilise the binder as shellac dissolves in alkaline media at 60° C. To facilitate their elimination, solvents having relatively low boiling points are preferred. Needless to say, the solvent should not be phytotoxic.

Different fungicides and/or insecticides may be applied to the seeds, and as these substances are well known per se no detailed discussion of their properties is necessary. Apart from the principal active ingredient(s) the solutions may also contain additives such as colourings, growth stimulants, plant hormones, minor nutrients, fertilizers, bird repellents.

The coating solution is most conveniently applied to the seeds by spraying whilst the seeds are in motion, conveniently in a tumbler, rotating drum or similar piece of equipment. Thereafter, the solvent is eliminated for example by application of a vacuum or passing warm air through the coated seeds. The vaporised solvent is optionally condensed for re-use. The relative proportions of coating solution to seed will depend, inter alia, on its concentration of active ingredients, the desired thickness of the coating and also on the size of the seed. In general, the coating solution to seed ratio will be 0.3 to 6:100 by weight.

Coatings in accordance with the invention may be applied to a wide variety of seeds, and may, likewise, contain a wide range of active ingredients. Particularly successful results have been obtained with seeds of rape.

In addition to having the advantages described in our European Pat. No. 10630 (possibility of forming thin coatings, firm adherence, mechanical strength, rapid application and drying) coatings prepared according to the present invention containing metal pigments have a very smooth surface which improves abrasion resistance and flow properties. Moreover, the coated seeds have an attractive glossy appearance.

The invention is illustrated by the following Examples, in which all parts, ratios and percentages are expressed on a weight basis.

EXAMPLE 1

A binder base composition is prepared from:

| | |
|---|---|
| Shellac | 9.0% |
| Coffee wax | 5.4 |
| Ethanol | 35.5 |
| Methylene chloride | 49.9 |
| Colouring | 0.2 |

With this base 2 coating solutions A & B are prepared from:

| | A | B |
|---|---|---|
| Base | 3000 | 2775 parts |
| Oftanol T | 4000 | 4000 |
| Aluminium pigment | 0 | 225 |

The solutions are applied to rape seed, in a ratio of 7:100 parts, by spraying whilst the seed is tumbled in a rotating drum. Solvent is then evaporated in a current of warm (about 30° C.) air.

Laboratory and field (Upper Austria, sown 17 June, plants counted 23 July) emergence trials, results of which are given below, show that the metal pigment has no significant effect on germination:

| Coating solution | % Emergence | |
|---|---|---|
| | Laboratory (48 h) | Field |
| A | 72 | 88 |
| B | 73 | 85 |

The abrasion resistance of the two lots of seed is determined as follows: 500 g lots of the seeds are placed in a cubical mixer (20 cm side) and rotated for 5 minutes at 39 rpm. The seeds are then sifted and weighed and the weight of dust produced is obtained by difference:

| Seed | Dust weight |
|---|---|
| A | 0.1231 g (0.61%) |
| B | 0.0297 g (0.15%) |

The flow characteristics of the two seed samples were determined as follows: a test tube, 30 mm diameter and 20 cm long, is completely filled with the seed. The tube is then closed by a conical cap (cone angle to vertical, at apex, 60°) with a 10 mm diameter hole in the centre. The tube is inverted and the time taken for all the seed to run out under gravity is determined 5 times for each sample. The results obtained, in seconds, are given below:

| Test | Sample A | Sample B |
|---|---|---|
| 1 | 22.9 | 20.1 |
| 2 | 23.5 | 19.9 |
| 3 | 23.0 | 21.0 |
| 4 | 23.2 | 19.5 |
| 5 | 24.0 | 19.9 |
| Mean | 23.3 | 20.08 |
| Standard deviation | ±0.39 | ±0.49 |
| Difference (relative) | 116% | 100% |

EXAMPLE 2

The base composition is used for preparing solutions of different compositions with which rape seed is coated by the method described in Example 1. ISO-PHENPHOS is used as plant protection agent instead of Oftanol T and the pigments are bronze rather than aluminium. In all, 13 trials are made, with the variables noted below:

| Trial | Variable |
|---|---|
| 1 | Untreated seed |
| 2 | Control, coating only, 2.5% on seed |
| 3 | Control, coating (2.5%) + inert filler (0.7%) |
| 4 | Fire red, glossy |
| 5 | Lemon, grade IaIa |
| 6 | Copper, glossy |
| 7 | Pale gold, glossy |
| 8 | Rich pale gold, colour printing type, glossy |
| 9 | Rich pale gold, grade IaIa |
| 10 | Rich pale gold, tarnish resistant, glossy |
| 11 | Rich pale gold, colour printing type, glossy |
| 12 | Rich pale gold, glossy |
| 13 | Rich gold glossy |

In Trials 4–13 the bronze pigment (1:100 on seed) is applied in a mixture containing 50% binder base, 14% inert filler (kieselguhr) and 36% plant protectant, at a ratio of mixture to seed of 5:100.

Laboratory germination trial results obtained with the coated seeds, after 2, 3 and 7 days, are reported in Table I.

TABLE I

| | | | % germination | | | |
|---|---|---|---|---|---|---|
| Rank | Trial | 2 days | Trial | 3 days | Trial | 7 days |
| 1 | 1 | 97 | 1 | 98 | 1 | 99 |
| 2 | 3 | 96 | 2 | 98 | 3 | 99 |
| 3 | 9 | 95 | 3 | 97 | 2 | 98 |
| 4 | 2 | 94 | 8 | 97 | 8 | 98 |
| 5 | 4 | 94 | 7 | 96 | 9 | 97 |
| 6 | 7 | 94 | 9 | 96 | 10 | 97 |
| 7 | 10 | 94 | 10 | 96 | 7 | 96 |
| 8 | 11 | 93 | 4 | 95 | 12 | 96 |
| 9 | 13 | 93 | 5 | 95 | 13 | 96 |

TABLE I-continued

| Rank | Trial | 2 days | Trial | 3 days | Trial | 7 days |
|------|-------|--------|-------|--------|-------|--------|
| 10 | 5 | 93 | 13 | 95 | 4 | 95 |
| 11 | 8 | 93 | 11 | 94 | 5 | 95 |
| 12 | 12 | 92 | 12 | 94 | 6 | 95 |
| 13 | 6 | 91 | 6 | 93 | 11 | 95 |

Despite the large amounts of metal the germination of the treated seeds showed no significant difference in comparison with the untreated seed and the controls.

EXAMPLE 3

A coating solution, suitable for water-soluble plant protection agents, is prepared from:

| | |
|---|---|
| Shellac | 14.0% |
| Ethanol | 51.4 |
| Butyl glycol | 4.7 |
| Sodium hydroxide | 1.0 |
| Aluminium pigment | 6.5 |
| Colouring | 0.4 |
| Water | 22.0 |

We claim:

1. A process for treating plant seeds with an active ingredient, which includes forming on the surface of the seeds a firmly adhering, moisture-permeable, essentially water-insoluble coating, by applying to the seeds a coating solution comprising 4.0 to 20% by weight of a binder and 45 to 95% by weight of a solvent for the binder, wherein: (i) the binder is a natural or synthetic resin or a natural or synthetic wax, and (ii) the respective weight ratios of solvent to binder and solvent to total solids in the solution are 3.5 to 20:1 and 0.4 to 6.0:1, and thereafter eliminating the solvent, characterised in that the coating solution also contains 5.0 to 25.0% by weight of a metal pigment.

2. A process according to claim 1 in which the metal pigment is copper, aluminium or bronze.

3. A process according to claim 1 or claim 2 in which the solution contains about 7.0% by weight of metal pigment.

4. A process according to claim 1 in which the binder includes shellac.

5. A process according to claim 4 in which the binder is a mixture of coffee wax and shellac.

6. A process according to claim 5 in which the solvent includes an aqueous alkali.

7. A process according to claim 4, 5 or 6 in which the solvent comprises ethanol.

8. A process according to claim 4 or claim 5 in which the solvent is a mixture of ethanol with acetone or methylene chloride.

9. A process according to claim 1 in which the binder includes coffee wax or polystyrene, and the solvent includes a halogenated hydrocarbon.

10. A process according to any preceding claim, in which 0.3 to 5 parts by weight of solution are applied to every 100 parts by weight of seed.

* * * * *

UNITED STATES PATENT AND TRADEMARK OFFICE
CERTIFICATE OF CORRECTION

PATENT NO. : 4,448,796
DATED : May 15, 1984
INVENTOR(S) : Franz Weiser, et al.

It is certified that error appears in the above—identified patent and that said Letters Patent is hereby corrected as shown below:

On the title page of the patent, the assignee "Societe D'Assistance Technique Pour Produits Nestle S. A., Lausanne, Switzerland" should read -- Sarea AG, Cham, Switzerland --.

Column 2, line 19, "Bronge" should read -- Bronze --.

Signed and Sealed this

Second Day of October 1984

[SEAL]

*Attest:*

GERALD J. MOSSINGHOFF

*Attesting Officer*     *Commissioner of Patents and Trademarks*